United States Patent [19]

Shtipelman

[11] Patent Number: 4,922,145
[45] Date of Patent: May 1, 1990

[54] STEPPER MOTOR
[75] Inventor: Boris A. Shtipelman, Rochester, N.Y.
[73] Assignee: Eastman Kodak Company, Rochester, N.Y.
[21] Appl. No.: 272,370
[22] Filed: Nov. 17, 1988
[51] Int. Cl.$^5$ ............................................. H02K 37/12
[52] U.S. Cl. ................................. 310/49 R; 310/268; 310/156
[58] Field of Search ..................... 310/49 R, 156, 254, 310/257, 268

[56] References Cited

U.S. PATENT DOCUMENTS

| | | | |
|---|---|---|---|
| 3,459,982 | 8/1969 | Cartier | 310/164 |
| 4,207,483 | 6/1980 | Baer | 310/49 R |
| 4,340,833 | 7/1982 | Sudo et al. | 310/268 |
| 4,501,981 | 2/1985 | Hansen | 310/49 R |
| 4,517,478 | 5/1985 | Oudet | 310/49 R |
| 4,639,084 | 1/1987 | Kugioka | 350/255 |
| 4,672,247 | 6/1987 | Madsen et al. | 310/49 R |
| 4,733,115 | 3/1988 | Barone et al. | 310/68 R |

Primary Examiner—Patrick R. Salce
Assistant Examiner—Judson H. Jones
Attorney, Agent, or Firm—Donald D. Schaper

[57] ABSTRACT

A stepper motor is disclosed which is comprised of planar elements. The motor comprises a disc-shaped rotor which includes a multipolar permanent magnet and generally planar stator coils mounted on opposite sides of the rotor. In order to provide a stepper motor which is efficient and is also relatively thin in the axial direction, generally planar pole plates having radially extending teeth are used to define the magnetic poles of the stator.

6 Claims, 6 Drawing Sheets

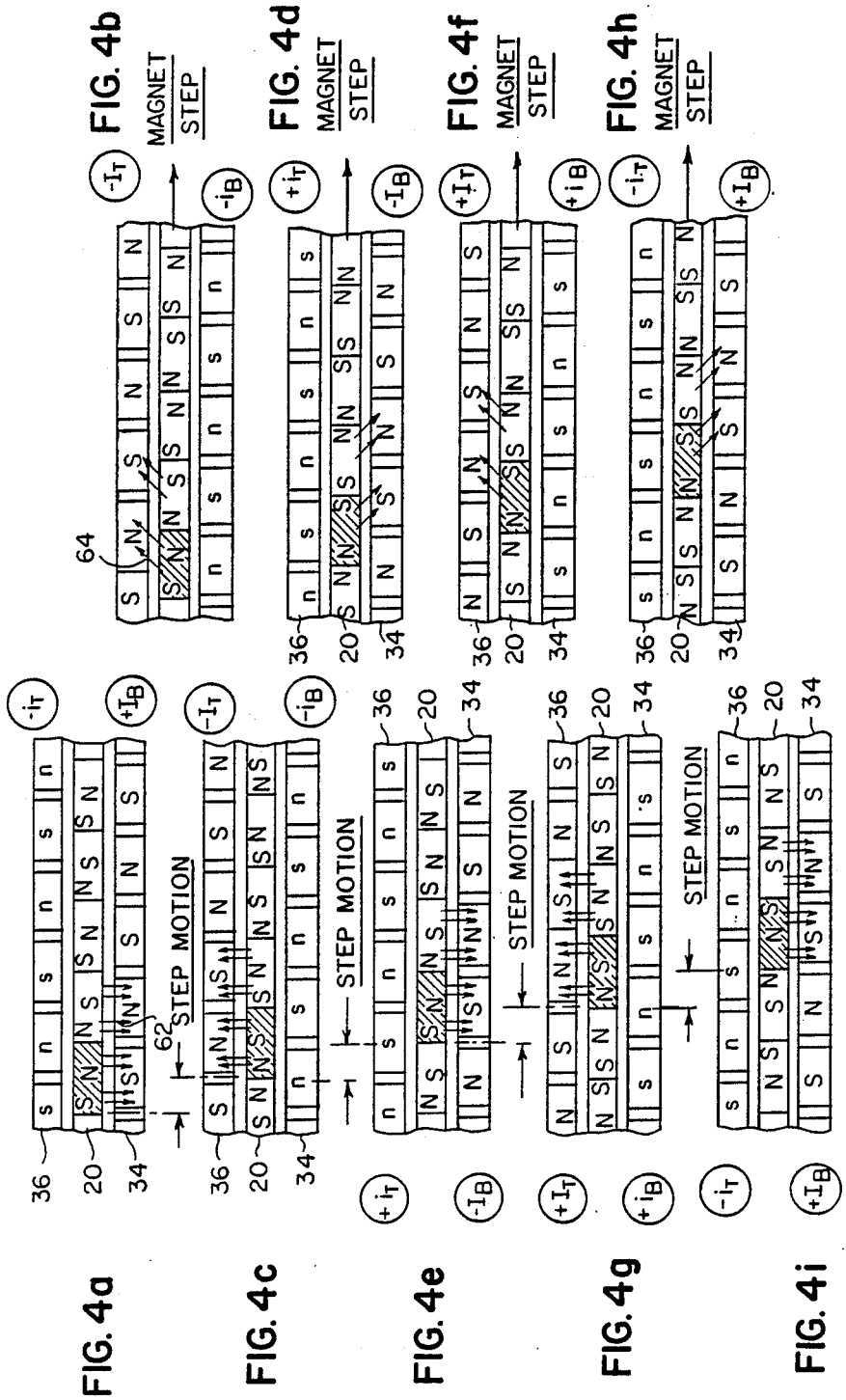

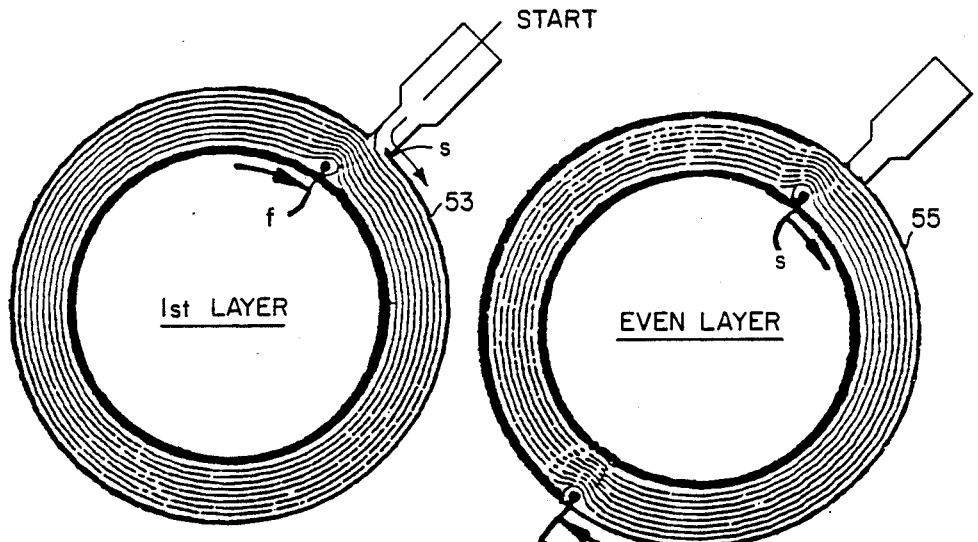
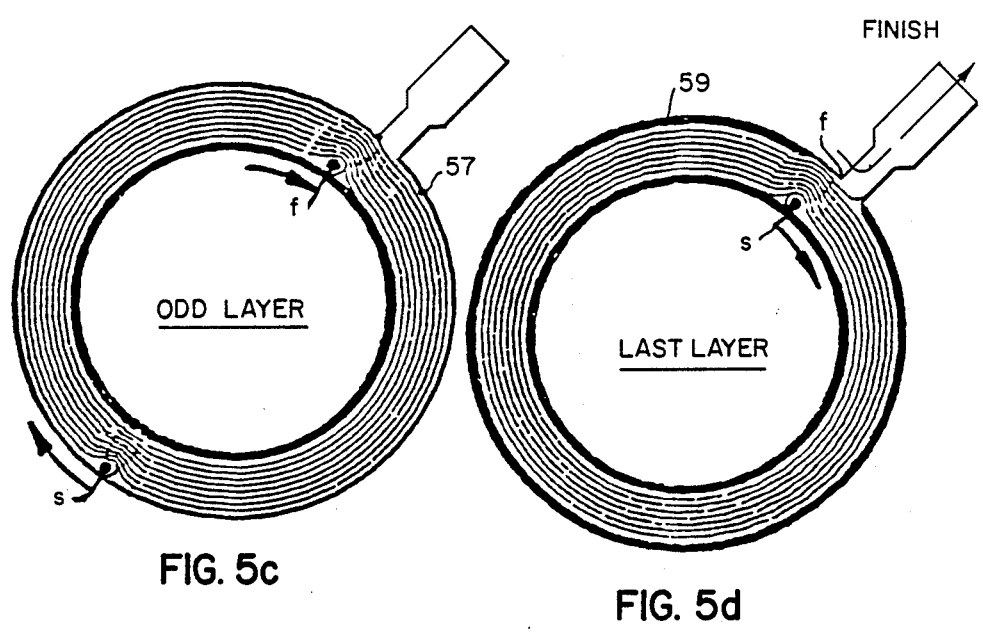
FIG. 5a
FIG. 5b
FIG. 5c
FIG. 5d

STEPPER MOTOR

BACKGROUND OF THE INVENTION

1. Field of the Invention

The present invention relates to stepper motors, and more particularly, to such a motor which is comprised of planar elements.

2. Description of the Prior Art

A stepper motor is an electromechanical device that converts electrical energy, delivered in the forms of pulses, into mechanical energy which is represented as discrete rotational or linear movements. Such a motor consists of two major elements—a stator which can include a coil having a number of windings and a rotor which can include permanent magnets. Electromagnetic interaction between these two elements causes the rotor to make a step movement for each polarity change in the stator windings. There is a direct correspondence in stepper motors between the energization of a particular stator coil and the position of the rotor. Thus, they are ideal open loop devices and are widely used in a variety of positioning applications such as printer paper feeds and small clocks. Optical encoders or magnetic Hall effect sensors can be used in stepper motors to close the control loop in order to obtain the maximum torque or acceleration from a given stepping motor or to improve its positioning accuracy.

In one known type of stepper motor, shown in U.S. Pat. No. 4,517,478, the rotor includes a permanent magnet in the form of a thin disc with magnetized alternate poles evenly distributed around its periphery. The motor also includes two stator halves, each of which contains four coils and a plurality of circumferentially-spaced pole pieces of high magnetic permeability. When the stator halves are assembled together, the pole pieces become aligned with each other to form C-shaped poles which form a small air gap in which the disc magnet of the rotor rotates. When current pulses are applied to the stator coils, the resulting magnetic flux penetrates the disc magnet, creating a combination of attracting and repelling forces between the stator and magnet poles that result in a step-by-step rotation of the rotor. A disadvantage of this motor is that the stator arrangement is very complex and is difficult and expensive to manufacture.

In a second type of stepper motor, as shown for example in U.S. Pat. No. 4,501,981, the motor comprises two axially-spaced helically wound stator coils, and a rotor mounted for rotation within the coils. The rotor includes a cylindrical multipolar permanent magnet which is radially magnetized. Each of the stator coils is provided with a field ring which includes regularly-spaced axial teeth forming salient pole pieces for the respective stator armatures. The use of the cylindrical permanent magnet rotor and the field rings with axial teeth make the motor relatively large and heavy, and thus, the motor is not suitable for applications, such as a drive motor for an autofocus mechanism, where a light compact motor is required.

SUMMARY OF THE INVENTION

It is an object of the present invention to overcome the problems of the prior art described above and to provide an improved stepper motor.

In accordance with one aspect of the present invention, there is provided a stepper motor comprising: a rotor which includes a disc-shaped permanent magnet; means for mounting the rotor for rotation; a stator which includes a first coil mounted on one side of the rotor and a second coil mounted on an opposite side thereof; and annular pole plates on opposite sides of the rotor, a first pole plate being located between the first coil and the rotor, and a second pole plate being located between the second coil and the rotor.

In one embodiment of the present invention, the stepper motor includes an annular top housing and an annular bottom housing which are spaced from each other by a cylindrical spacer. A disc-shaped rotor is mounted for rotation within the motor, and generally-planar stator coils are supported on opposite sides of the rotor. A generally planar pole plate having radially-extending teeth is located adjacent a stator coil on one side of the rotor, and an identical pole plate is located adjacent a stator coil on the opposite side of the rotor.

A principal advantage of the stepper motor of the present invention is that the planar construction of the motor makes it very compact, and thus, the motor can be used where space requirements are limited. The motor is also particularly suitable for use in applications, such as a drive motor for an autofocus mechanism in a camera, where there must be an opening in a center portion of the motor. A further advantage of the motor is that major parts of the motor are formed from sheet material which facilitates the manufacturing and assembly of the motor.

Other features and advantages will become apparent upon reference to the following description of the preferred embodiments when read in light of the attached drawings.

BRIEF DESCRIPTION OF THE DRAWINGS

FIGS. 4a–4i show the sequence of operation of the stepper motor;

FIGS. 5a–5d show the windings in layers of a stator coil in the motor shown in FIG. 1;

DESCRIPTION OF THE PREFERRED EMBODIMENTS

Figure 1:
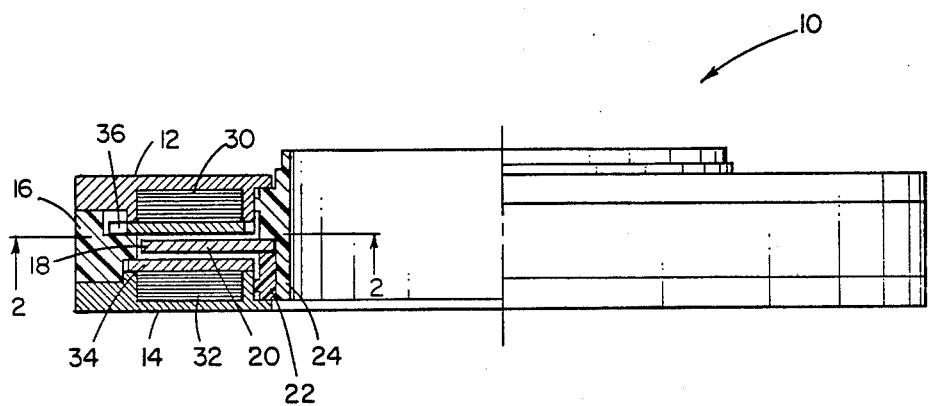
FIG. 1 is an elevational view of the stepper motor of the present invention, with parts shown in section.

With reference to FIG. 1, there is shown a stepper motor 10 constructed in accordance with the present invention. Motor 10 comprises an annular top housing 12 and an annular bottom housing 14 which are fixed to opposite sides of a cylindrical spacer 16. Housings 12 and 14 are made from a magnetizable material, such as steel, and spacer 16 is preferably formed of a nonmagnetic material, e.g., aluminum. A rotor 18 is mounted for rotation within the housing sections 12 and 14. Rotor 18 includes a disc-shaped permanent magnet 20 which is carried on a bearing sleeve 24 and is clamped to the sleeve by means of a bearing ring 22. Permanent magnet 20 is a multipolar magnet and is made up of a plurality of discrete magnets 21 (FIG. 3) evenly distributed around the periphery thereof. Magnet 20 can be formed from, for example, samarium cobalt.

A top stator coil 30 is mounted in top housing 12, and a bottom stator coil 32 is mounted in bottom housing 14. A bottom pole plate 34 is located between coil 32 and rotor 20, and a top pole plate 36 is located between coil 30 and rotor 20. Coils 30 and 32 are generally planar, and the coils can be wound in a conventional manner or the coils can be photofabricated. Each of the coils 30, 32, preferably includes a number of layers of helically disposed etched copper windings, as shown, for example, in FIGS. 5a–5d; the layers of copper windings are separated by intermediate layers of a dielectric material (not shown). As shown in FIG. 5a, a coil 30, 32, comprises a first layer 53 having a winding starting at a point s and ending at a point f, even layers 55 (FIG. 5b) starting at s and finishing at f, odd layers 57 as shown in FIG. 5c, and finally, a last layer 59 as shown in FIG. 5d. It will be understood that there can be a number of even layers 55 and odd layers 57 and the actual number will depend on the requirements of a particular motor. Interconnects, which form electrical connections between successive copper layers at the points s and f, can be formed by means of a conductive epoxy. A more complete description of the fabrication of a coil, as disclosed herein, is described in commonly-assigned U.S. Pat. No. 4,733,115, granted Mar. 22, 1988.

Figure 2:
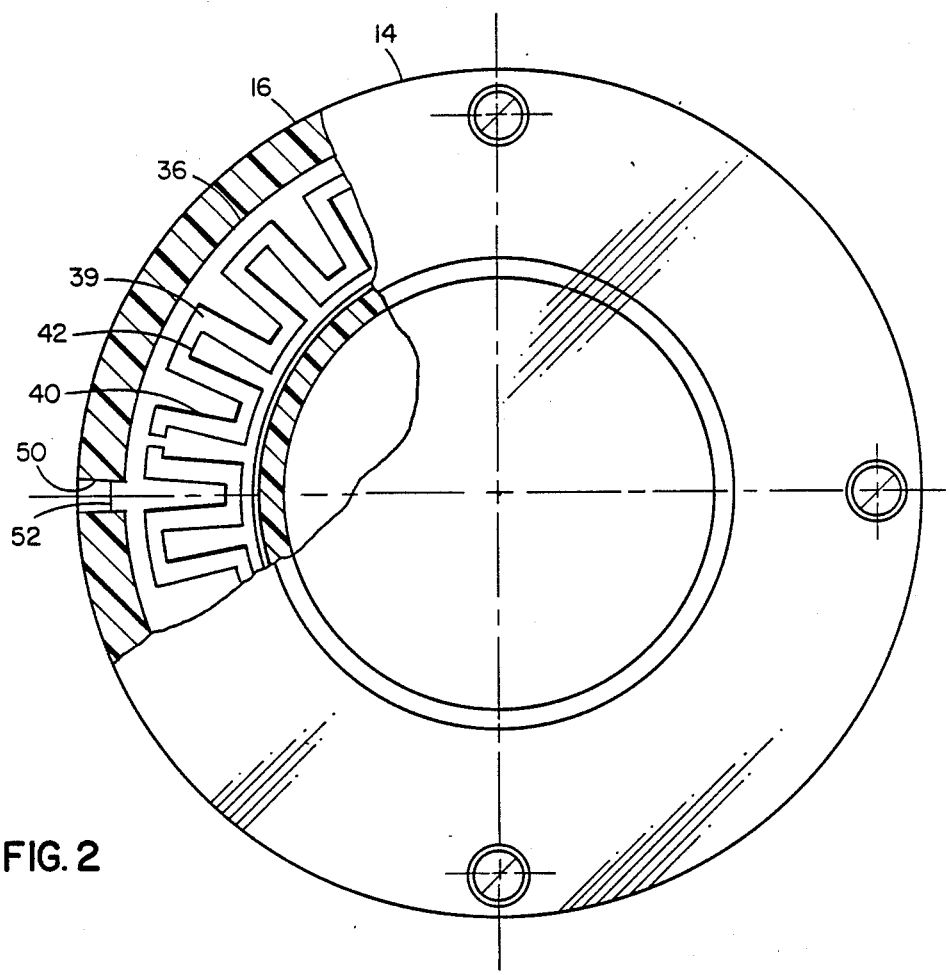
FIG. 2 is a top plan view of the stepper motor, with parts shown in a partial section taken along the line 2—2 in FIG. 1.
Figure 3:
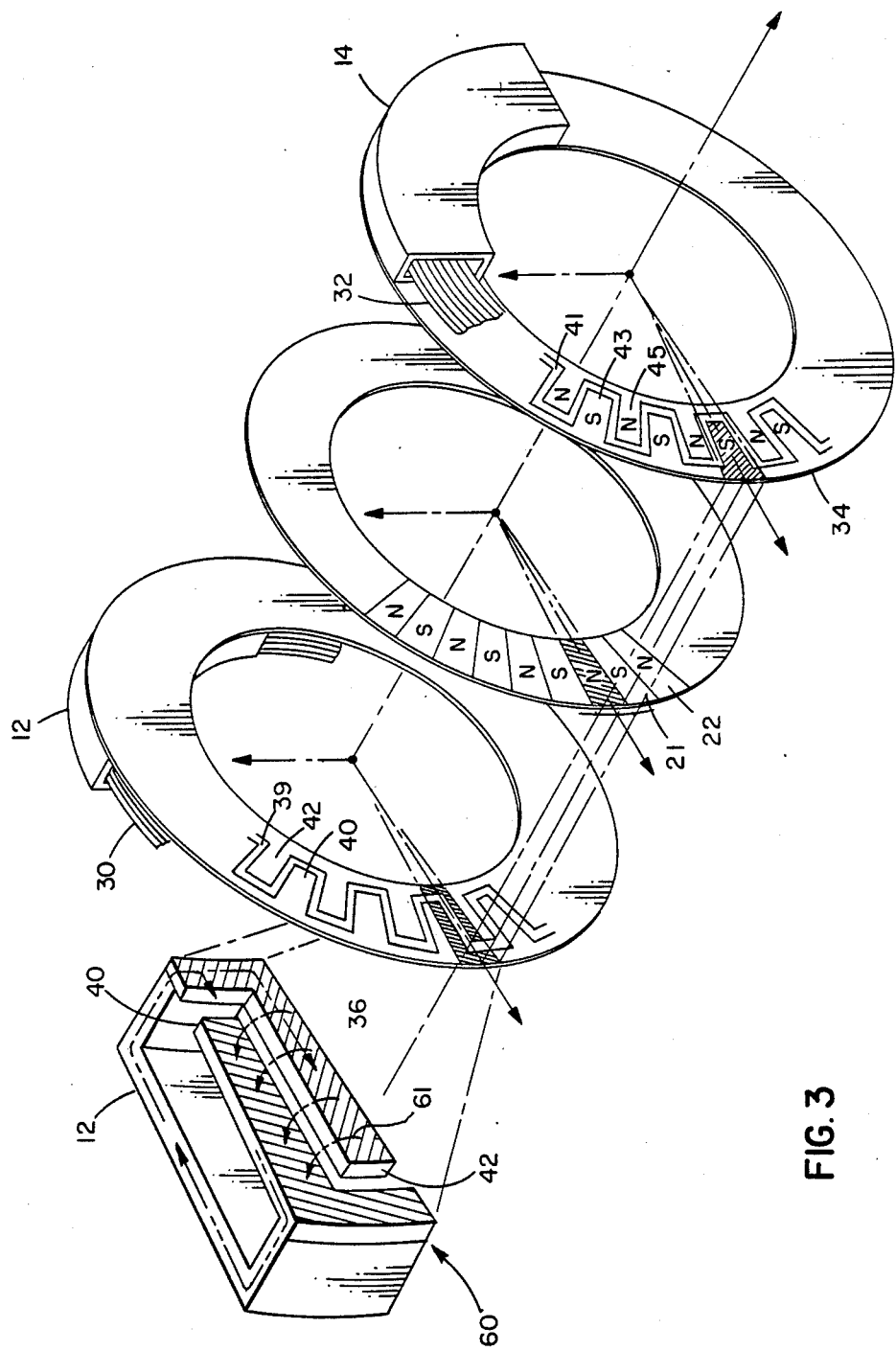
FIG. 3 is an exploded perspective of certain parts of the stepper motor.

One of the elements of the present invention which makes it possible to achieve a relatively thin and compact motor is the use of generally planar pole plates instead of, for example, C-shaped pole pieces as used in the prior art discussed herein. Pole plates 34 and 36 can be formed from silicon steel sheets. As shown in FIGS. 2 and 3, pole plate 36 includes a serpentine cut 39 which defines a number of inner planar teeth 40 and outer planar teeth 42, and pole plate 34 has a serpentine cut 41 therein which defines inner planar teeth 43 and outer planar teeth 45. As shown in FIG. 2, spacer 16 has grooves 50 formed in a periphery thereof, and each of the grooves 50 is adapted to receive a tang 52 on one of the pole plates 34 and 36. Grooves 50 are adapted to locate planar pole pieces 34 and 36 such that the planar teeth 43, 45, of pole plate 34 have an angular offset equal to a quarter of a pole pitch relative to the planar teeth 40, 42, of pole plate 36.

In a representative example of the present invention, permanent magnet 20 includes 40 discrete magnets 21 (FIG. 3) evenly distributed around the periphery thereof. Each of the coils 30, 32, includes ten separate layers (not shown) of etched 3.5 oz. copper bound together with intermediate layers of "prepreg" which is a fiberglass webbing material prepregnated with epoxy. Each of the even layers 55 and odd layers 57 has 8.5 turns, and the first layer 53 and the last layer 59 each have 9 turns. Pole plates 34 and 36 are made from silicon steel sheets of a thickness of 0.025 inches, and each of the pole plates has 20 pairs of teeth.

When an electric current is passed through the coils 30 and 32, an electromagnetic field is created. The magnetic flux path of the field of coil 30 will be directed as illustrated in a segment 60 (FIG. 3) which includes a portion of pole plate 36 and housing 12. As illustrated by arrows 61 on segment 60, the planar teeth 40 and 42 become magnetic poles when coil 30 is energized. Planar teeth 43 and 45 become magnetic poles in a similar manner when coil 32 is energized.

The sequence of operation of motor 10 is shown in FIGS. 4a–4i. With reference to FIG. 4a, where permanent magnet 20 and pole plates 34 and 36 are oriented relative to each as shown in FIG. 3, the south and north poles are shown on pole plate 34 which are formed as result of current $+I_B$ passing through the bottom coil 32. The magnetic poles in plate 34 will attract respective north and south poles of the permanent magnet 20. These attraction forces are indicated by arrows 62 for two pairs of poles, it being understood that similar forces exist around the entire magnet 20. Displaced in an angular direction by a quarter of a pole pitch, the north and south poles in the top plate 36, indicated by lower-case letters "n" and "s", are created by a current $-i_T$, which is smaller than $+I_B$ and passes through the top coil 30. These poles in top plate 36 will repel similar poles along the top surface of magnet 20, thereby increasing its attraction to the poles in plate 34.

The next step motion of rotor 18, shown in FIG. 4b, takes place when the top coil 30 is energized by a current $-I_T$ together with a smaller current $-i_B$ passing through the bottom coil 32. This results in an attraction with forces illustrated as indicated by arrows 64, between the top north and south poles (upper-case letters "N" and "S") and respective south and north poles along the top face of the permanent magnet 20. In addition, repelling forces will be created between north and south poles along the bottom face of magnet 20 and similar poles in the bottom plate 34 (lower-case letters "n" and "s"). Action of those forces will result in a step motion of the rotor 18. The final position of rotor 18, after this step, is illustrated in FIG. 4c. The remaining views, FIGS. 4d–4i, illustrate how similar current changes in the top coil 30 and bottom coil 32 will affect consecutive step motions of the rotor 18.

Current to coils 30 and 32 can be controlled by a conventional drive circuit (not shown), for example, a two-phase stepper motor driver, obtainable from General Controls, Inc. The drive circuit forms no part of the present invention, and thus, a detailed explanation of the circuit will not be given herein.

A second embodiment of the invention is shown in FIGS. 6–8d. As shown therein, a motor 110 comprises a top housing 112 and a bottom housing 114. Housings 112 and 114 are formed of a nonmagnetic material such as aluminum. A rotor 118 is supported on a rotor shaft 119 and includes a disc-shaped permanent magnet 120 which is supported in a magnet clamp 122. Magnet clamp 122 is fixed to the rotor shaft 119 which is supported for rotation in, for example, bushings 123 and 125 or in ball bearings (not shown). As viewed in FIG. 6, a left stator coil 130, which surrounds a spacer 131, is supported adjacent permanent magnet 120 and a right stator coil 132, which surrounds a spacer 133, is supported adjacent magnet 120 on an opposite side of motor 110. The shape of coils 130 and 132 is best shown in FIGS. 8a–8d. Coils 130 and 132 are formed with a first layer 153, even layers 155, odd layers 157, and last layers 159 as described above with regard to coils 30 and 32 in motor 10.

Figure 6:
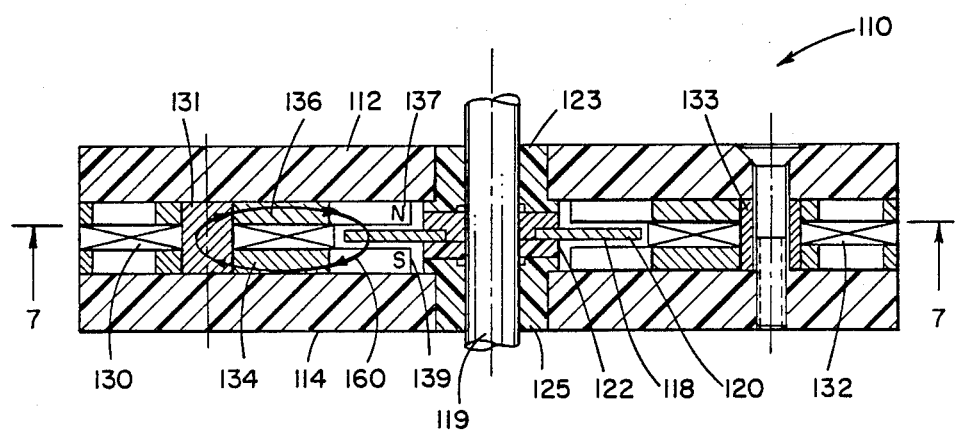
FIG. 6 is an elevational view, shown in section, of a second embodiment of the present invention.
Figure 7:
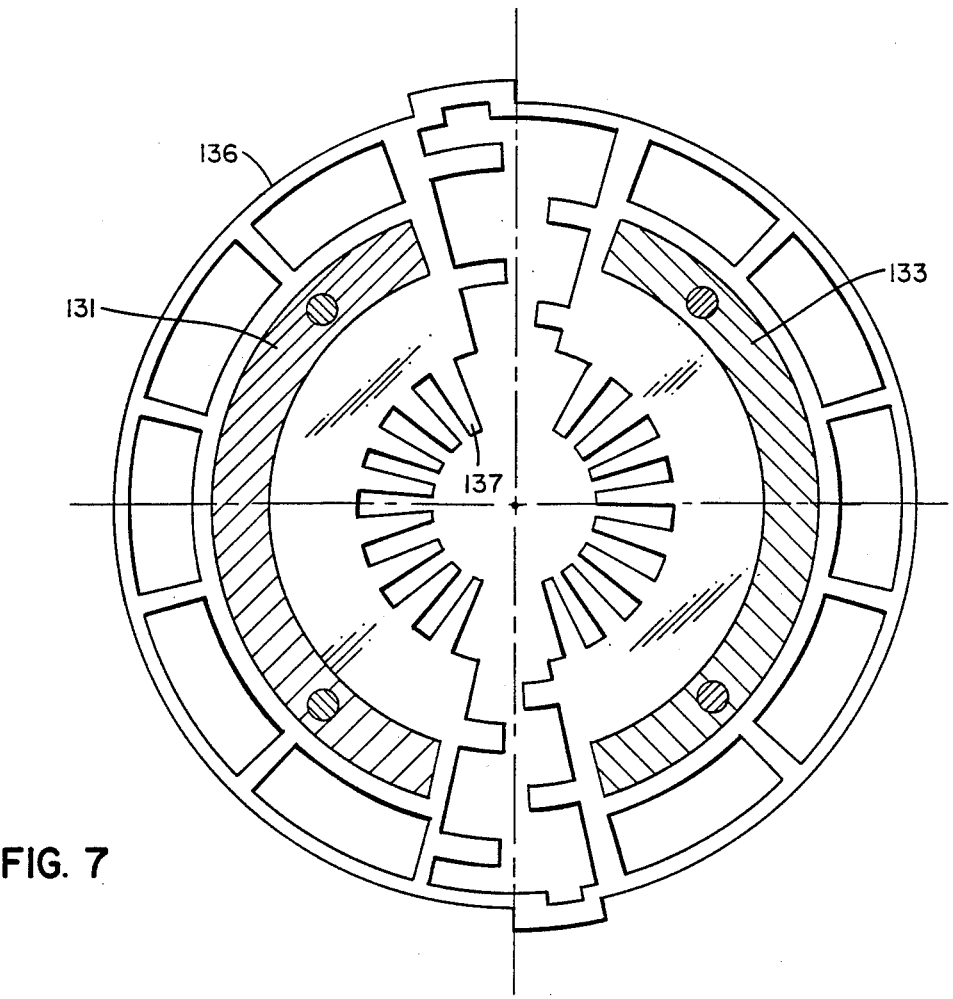
FIG. 7 is a sectional view taken along the line 7—7 in FIG. 6.
Figure 8A:
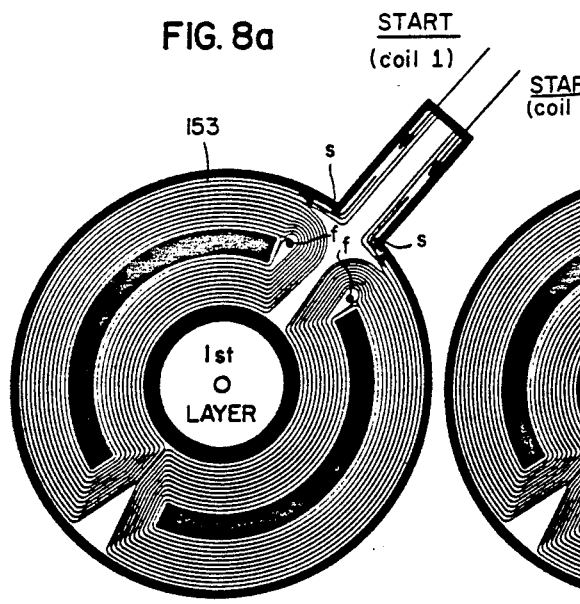
FIGS. 8a–8d show the windings in layers of the stator coils of the embodiment shown in FIG. 6.
Figure 8B:
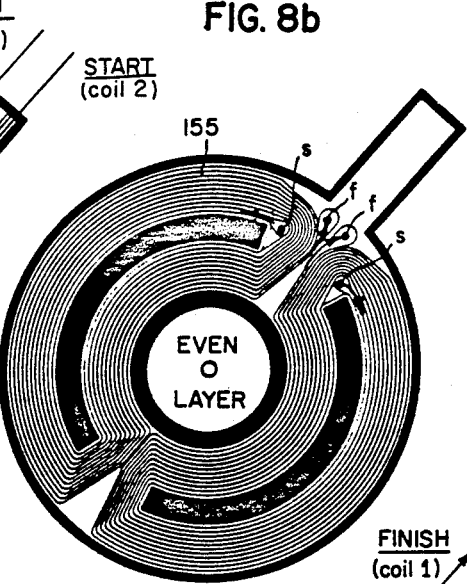
Figure 8C:
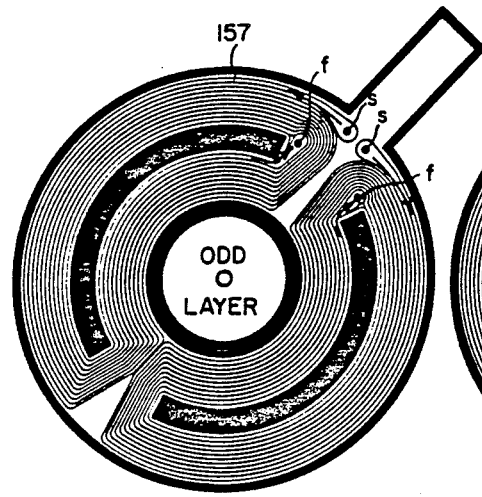
Figure 8D:
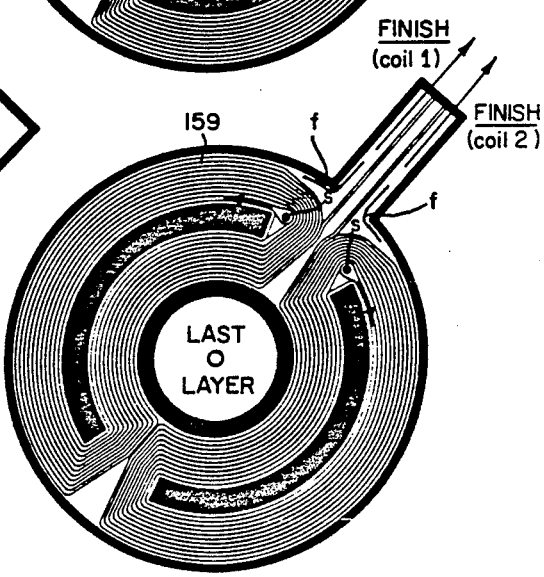

As shown in FIG. 6, a pole plate 136 is mounted above rotor 118, and a pole plate 134 is mounted under rotor 118. As shown in FIG. 7, pole plate 136 has a number of radial teeth 137 arranged in two diametrically-opposed groups. The teeth 137 are located at the same radius and spacing as the poles of the disc-shaped permanent magnet 120. However, with respect to the first group of teeth, the second one is shifted in a circumferential direction, as shown in FIG. 7. The radial teeth 139 in pole plate 134 are identical to the teeth in pole plate 136. The flux generated when coil 130 is energized is indicated by arrows 160. When this occurs, teeth 137 become north poles and the opposing teeth 139 in plate 134 become south poles. As a result, the rotor 118 will rotate until its magnet poles align against the top and bottom plate poles of opposite polarity. When current is applied to coil 132, the next step occurs as described above with regard to motor 10.

This invention has been described in detail with particular reference to a preferred embodiment thereof. However, it will be understood that variations and modifications can be effected within the spirit and scope of the invention.

What is claimed is:

1. A stepper motor comprising:

an disc-shaped rotor disposed in said motor for rotation about an axis, said rotor including a plurality of discrete permanent magnets evenly distributed around the periphery thereof;

means for mounting said rotor for rotation, said mounting means including a cylindrical element having a central opening therein along said axis for receiving a driven element;

a stator which includes a generally planar first coil mounted on one side to said rotor and a generally planar second coil mounted on an opposite side thereof;

generally planar annular pole plates mounted on opposite sides of said rotor, a first pole plate being located between said first coil and said rotor, a second pole plate being located between said second coil and said rotor, each of said pole plates including a plurality of circumferentially spaced radially extending teeth; and a first housing which extends around said first coil and is in contact with said first pole plate and a second housing which extends around said second coil and is in contact with said second pole plate, said housings being formed of a magnetizable material, and said housings supporting said mounting means and rotor for rotation.

2. A stepper motor, as defined in claim 1, wherein the radially-extending teeth in each of said plates are formed by a serpentine cut in the plate.

3. A stepper motor, as defined in claim 1, wherein one of said pole plates is offset circumferentially relative to the other plate by one quarter of a pole pitch.

4. A stepper motor, as defined in claim 1, wherein each of said pole plates has a number of radial teeth therein, and the number of teeth in each plate is equal to the number of magnets in said rotor.

5. A stepper motor, as defined in claim 1, wherein said coils are photofabricated coils.

6. A stepper motor, as defined in claim 1, wherein each of said coils has helical windings.

* * * * *